(12) United States Patent
Zhu

(10) Patent No.: US 8,200,582 B1
(45) Date of Patent: Jun. 12, 2012

(54) MOBILE DEVICE PASSWORD SYSTEM

(75) Inventor: Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 154 days.

(21) Appl. No.: 12/348,377

(22) Filed: Jan. 5, 2009

(51) Int. Cl.
*H04K 1/00* (2006.01)
*H04L 9/00* (2006.01)

(52) U.S. Cl. .............. 705/64; 705/51; 705/71; 705/75

(58) Field of Classification Search ............. 705/64
See application file for complete search history.

(56) References Cited

U.S. PATENT DOCUMENTS

| | | | |
|---|---|---|---|
| 5,453,601 A | 9/1995 | Rosen | |
| 5,496,966 A | 3/1996 | Hightower et al. | |
| 6,122,625 A | 9/2000 | Rosen | |
| 6,446,049 B1 | 9/2002 | Janning et al. | |
| 6,679,423 B2 | 1/2004 | Ijichi et al. | |
| 6,879,965 B2 | 4/2005 | Fung et al. | |
| 6,880,085 B1 * | 4/2005 | Balczewski et al. | 713/182 |
| 7,146,159 B1 | 12/2006 | Zhu | |
| 7,233,785 B2 | 6/2007 | Yamagishi et al. | |
| 7,269,256 B2 | 9/2007 | Rosen | |
| 7,413,113 B1 | 8/2008 | Zhu | |
| 7,434,723 B1 | 10/2008 | White et al. | |
| 7,475,044 B1 | 1/2009 | Kawai et al. | |
| 7,494,067 B1 | 2/2009 | Zhu | |
| 7,546,956 B2 | 6/2009 | Adams et al. | |
| 7,644,039 B1 | 1/2010 | Magee et al. | |
| 7,644,859 B1 | 1/2010 | Zhu | |
| 7,707,113 B1 | 4/2010 | DiMartino et al. | |
| 7,748,636 B2 | 7/2010 | Finn | |
| 7,819,307 B2 | 10/2010 | Lyons et al. | |
| 7,822,688 B2 | 10/2010 | Labrou et al. | |
| 7,926,714 B1 | 4/2011 | Zhu | |
| 8,055,184 B1 | 11/2011 | DiMartino et al. | |
| 8,060,449 B1 | 11/2011 | Zhu | |
| 8,123,128 B1 | 2/2012 | Zhu | |
| 8,126,806 B1 | 2/2012 | DiMartino et al. | |
| 2001/0005184 A1 | 6/2001 | Tsuno et al. | |
| 2002/0006806 A1 | 1/2002 | Kinnunen et al. | |
| 2002/0011519 A1 | 1/2002 | Shults, III | |
| 2002/0052754 A1 | 5/2002 | Joyce et al. | |
| 2002/0062284 A1 | 5/2002 | Kawan | |
| 2002/0123971 A1 | 9/2002 | Maritzen et al. | |
| 2002/0147913 A1 | 10/2002 | Lun Yip | |
| 2003/0009382 A1 | 1/2003 | D'Arbeloff et al. | |

(Continued)

OTHER PUBLICATIONS

DiMartino, Allison A., et al., Patent Application entitled, "System and Method for Active Jamming of Confidential Information Transmitted at a Point-of-Sale Reader," filed Jan. 30, 2008, U.S. Appl. No. 12/022,903.

(Continued)

*Primary Examiner* — Calvin L Hewitt, II
*Assistant Examiner* — Dante Ravetti

(57) ABSTRACT

A mobile payment system password restriction system is provided. The system comprises a portable electronic device, an electronic wallet application, and an access restriction application that, when executed on the portable electronic device, monitors the network connection status of the portable electronic device. The system also disables password access to the electronic wallet application after a first predetermined number of consecutive failed password access attempts to the electronic wallet application when the network connection status is not connected. The system also re-enables password access to the electronic wallet application in response to receiving a key code entered into portable electronic device, wherein the key code is different from the password.

18 Claims, 6 Drawing Sheets

U.S. PATENT DOCUMENTS

| | | | |
|---|---|---|---|
| 2003/0028481 A1 | 2/2003 | Flitcroft et al. | |
| 2003/0032409 A1* | 2/2003 | Hutcheson et al. | 455/414 |
| 2003/0045328 A1 | 3/2003 | Natsuno | |
| 2003/0070080 A1 | 4/2003 | Rosen | |
| 2003/0083933 A1 | 5/2003 | McAlear | |
| 2003/0149900 A1* | 8/2003 | Glassman et al. | 713/202 |
| 2004/0093265 A1 | 5/2004 | Ramchandani et al. | |
| 2004/0122771 A1 | 6/2004 | Celi, Jr. et al. | |
| 2004/0192303 A1 | 9/2004 | Puthenkulam | |
| 2004/0203601 A1 | 10/2004 | Morriss et al. | |
| 2005/0085847 A1* | 4/2005 | Galdonik et al. | 606/200 |
| 2005/0216424 A1 | 9/2005 | Gandre et al. | |
| 2005/0234778 A1 | 10/2005 | Sperduti et al. | |
| 2006/0073808 A1 | 4/2006 | Buchert | |
| 2006/0085847 A1* | 4/2006 | Ikeuchi et al. | 726/6 |
| 2006/0136334 A1 | 6/2006 | Atkinson et al. | |
| 2006/0165060 A1 | 7/2006 | Dua | |
| 2006/0167823 A1 | 7/2006 | York et al. | |
| 2006/0191995 A1 | 8/2006 | Stewart et al. | |
| 2006/0211408 A1 | 9/2006 | Yamagishi et al. | |
| 2007/0010213 A1 | 1/2007 | Dewan | |
| 2007/0011461 A1 | 1/2007 | Jeng | |
| 2007/0080215 A1 | 4/2007 | Ramachandran et al. | |
| 2007/0095892 A1 | 5/2007 | Lyons et al. | |
| 2007/0125840 A1* | 6/2007 | Law et al. | 235/379 |
| 2007/0145152 A1 | 6/2007 | Jogand-Coulomb et al. | |
| 2007/0198410 A1 | 8/2007 | Labgold et al. | |
| 2007/0223685 A1 | 9/2007 | Boubion et al. | |
| 2007/0233615 A1 | 10/2007 | Tumminaro | |
| 2007/0234427 A1 | 10/2007 | Gardner et al. | |
| 2007/0244811 A1 | 10/2007 | Tumminaro | |
| 2007/0248232 A1* | 10/2007 | Driscoll et al. | 380/280 |
| 2007/0255620 A1 | 11/2007 | Tumminaro et al. | |
| 2007/0255652 A1 | 11/2007 | Tumminaro et al. | |
| 2007/0281664 A1 | 12/2007 | Kaneko et al. | |
| 2007/0291995 A1 | 12/2007 | Rivera | |
| 2008/0059379 A1 | 3/2008 | Ramaci et al. | |
| 2008/0067240 A1 | 3/2008 | Nakano et al. | |
| 2008/0126260 A1 | 5/2008 | Cox et al. | |
| 2008/0201212 A1 | 8/2008 | Hammad et al. | |
| 2008/0238610 A1 | 10/2008 | Rosenberg | |
| 2008/0297306 A1* | 12/2008 | Huajun et al. | 340/5.51 |
| 2008/0315989 A1 | 12/2008 | Mirkazemi-Moud et al. | |
| 2009/0018964 A1 | 1/2009 | Liu et al. | |
| 2009/0046858 A1* | 2/2009 | Iyer et al. | 380/259 |
| 2009/0050689 A1 | 2/2009 | Sako et al. | |
| 2009/0078761 A1 | 3/2009 | Sines | |
| 2009/0097531 A1 | 4/2009 | Franceschini et al. | |
| 2009/0253409 A1* | 10/2009 | Slavov et al. | 455/411 |
| 2009/0270174 A1* | 10/2009 | Kelly et al. | 463/42 |
| 2009/0313689 A1* | 12/2009 | Nystrom et al. | 726/9 |
| 2010/0030651 A1 | 2/2010 | Matotek et al. | |
| 2010/0094752 A1 | 4/2010 | Heath | |
| 2010/0133337 A1 | 6/2010 | Van Rensburg | |
| 2011/0006112 A1 | 1/2011 | Mueller | |
| 2011/0053560 A1* | 3/2011 | Jain et al. | 455/411 |

OTHER PUBLICATIONS

Katzer, Robin D., et al., Patent Application entitled, "Control of Secure Elements through Point-of-Sale Device," filed Apr. 8, 2008, U.S. Appl. No. 12/099,771.

Zhu, Kevin, Patent Application entitled, "Partially Delegated Over-the-Air Provisioning of a Secure Element," filed Jan. 5, 2009, U.S. Appl. No. 12/348,371.

Persson, Sarah A.V., et al., Patent Application entitled, "Electronic Wallet Removal from Mobile Electronic Devices," filed Feb. 16, 2009, U.S. Appl. No. 12/371,901.

BlackBerry Enterprise Server for Microsoft Exchange, Version 4.0—Handheld Management Guide, Last Modified Aug. 18, 2006, Research in Motion Limited, Canada.

BlackBerry Enterprise Server for Microsoft Exchange, Version 4.0—Administration Guide, Last Modified Nov. 10, 2006, Research in Motion Limited, Canada.

Derfler, Frank J., et al., "How Networks Work," Sep. 2000, Que Corporation, A Division of MacMillan Computer Publishing, USA.

Office Action dated Mar. 11, 2011, U.S. Appl. No. 12/022,903.

Office Action dated Mar. 1, 2011, U.S. Appl. No. 12/099,771.

Office Action—Restriction dated Mar. 16, 2011, U.S. Appl. No. 12/348,371.

Office Action dated May 24, 2011, U.S. Appl. No. 12/348,371.

Office Action—Restriction dated Mar. 14, 2011, U.S. Appl. No. 12/371,901.

Office Action dated Apr. 14, 2011, U.S. Appl. No. 12/371,901.

DiMartino, Allison, "Method for Launching an Electronic Wallet," Filing Date—Dec. 3, 2007, U.S. Appl. No. 11/949,759.

DiMartino, Allison, "Method and System for Blocking Confidential Information at a Point-of-Sale Reader from Eavesdropping," Filing Date—Sep. 27, 2007, U.S. Appl. No. 11/863,229.

Office Action dated Jun. 17, 2009, U.S. Appl. No. 11/949,759, filed Dec. 3, 2007.

Office Action dated Nov. 13, 2009, U.S. Appl. No. 11/949,759, filed Dec. 3, 2007.

Office Action dated May 25, 2010, U.S. Appl. No. 11/949,759, filed Dec. 3, 2007.

Final Office Action dated Sep. 10, 2010, U.S. Appl. No. 11/949,759, filed Dec. 3, 2007.

Office Action dated Feb. 15, 2011, U.S. Appl. No. 11/949,759, filed Dec. 3, 2007.

Office Action dated Feb. 17, 2009, U.S. Appl. No. 11/863,229, filed Sep. 27, 2007.

Office Action dated Sep. 14, 2009, U.S. Appl. No. 11/863,229, filed Sep. 27, 2007.

Office Action dated Dec. 24, 2009, U.S. Appl. No. 11/863,229, filed Sep. 27, 2007.

Final Office Action dated Jun. 22, 2010, U.S. Appl. No. 11/863,229, filed Sep. 27, 2007.

Office Action dated Mar. 16, 2011, U.S. Appl. No. 11/863,229, filed Sep. 27, 2007.

Office Action dated Mar. 6, 2009, U.S. Appl. No. 11/863,632, filed Sep. 28, 2007.

Office Action dated May 6, 2009, U.S. Appl. No. 11/863,632.

Notice of Allowance dated Dec. 1, 2009, U.S. Appl. No. 11/863,632.

DiMartino, Allison A., et al., Patent Application entitled, "System and Method for Active Jamming of Confidential Information Transmitted at a Point-of-Sale Reader," filed Aug. 11, 2011, U.S. Appl. No. 13/207,645.

Final Office Action dated Aug. 5, 2011, U.S. Appl. No. 11/949,759, filed Dec. 3, 2007.

Notice of Allowance dated Jun. 21, 2011, U.S. Appl. No. 12/022,903.

Office Action dated Aug. 3, 2011, U.S. Appl. No. 12/099,771.

Final Office Action dated Aug. 22, 2011, U.S. Appl. No. 11/863,229, filed Sep. 27, 2007.

Supplemental Notice of Allowance dated Sep. 13, 2011, U.S. Appl. No. 12/022,903.

Notice of Allowance dated Sep. 9, 2011, U.S. Appl. No. 12/348,371.

Anonymous, "Sourcebook '96," Progressive Grocer Sourcebook '96 Supplement, Dec. 1995, pp. Cover-48, Maclean-Hunter Media Inc.

Zhu, Kevin, Patent Application entitled, "Partially Delegated Over-the-Air Provisioning of a Secure Element," filed Oct. 10, 2011, U.S. Appl. No. 13/270,205.

Notice of Allowance dated Oct. 17, 2011, U.S. Appl. No. 11/949,759, filed Dec. 3, 2007.

Pre-Interview Communication dated Nov. 15, 2011, U.S. Appl. No. 13/207,645, filed Aug. 11, 2011.

Advisory Action dated Oct. 21, 2011, U.S. Appl. No. 11/863,229, filed Sep. 27, 2007.

Pre-Interview Communication dated Nov. 9, 2011, U.S. Appl. No. 12/702,270, filed Feb. 8, 2010.

Supplemental Notice of Allowance dated Sep. 28, 2011, U.S. Appl. No. 12/022,903.

Supplemental Notice of Allowance dated Oct. 6, 2011, U.S. Appl. No. 12/348,371.

Final Office Action dated Oct. 14, 2011, U.S. Appl. No. 12/371,901.
DiMartino, Allison, "Method for Launching an Electronic Wallet," Filing Date—Jan. 4, 2012, U.S. Appl. No. 13/343,708.
Notice of Allowance dated Dec. 14, 2011, U.S. Appl. No. 12/702,270, filed on Feb. 8, 2010.
Final Office Action dated Jan. 4, 2012, U.S. Appl. No. 12/099,771.

FAIPP Pre-Interview Communication dated Feb. 21, 2012, U.S. Appl. No. 13/270,205.
Advisory Action dated Feb. 9, 2012, U.S. Appl. No. 12/371,901.

* cited by examiner

MOBILE DEVICE PASSWORD SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic wallet applications installed on portable electronic devices may be vulnerable to fraudulent use when a portable electronic device is lost or stolen. Passwords used to protect electronic wallet applications are often short, sometimes two or three keypad entries, as users may wish avoid the nuisance and inconvenience of remembering and entering a long password into a handheld device. Identity thieves who steal portable devices may exploit short passwords to more easily access the electronic wallet. Identity thieves may use brute force attack methods to generate a large number of keypad entry combinations in a short time that eventually discover the correct password to break into the electronic wallet application. Once inside the application, the identity thief may access the value stored in debit and transit cards and draw on the electronic credit cards stored in the application. More sophisticated identity thieves may use the information stored in the electronic wallet application to steal funds.

SUMMARY

In an embodiment, a mobile payment system password restriction system is provided. The system comprises a portable electronic device, an electronic wallet application, and an access restriction application that, when executed on the portable electronic device, monitors the network connection status of the portable electronic device. The system also disables password access to the electronic wallet application after a first predetermined number of consecutive failed password access attempts to the electronic wallet application when the network connection status is not connected. The system also re-enables password access to the electronic wallet application in response to receiving a key code entered into portable electronic device, wherein the key code is different from the password.

In another embodiment, a method of protecting access to an electronic wallet application executing on a portable electronic device is provided. The method comprises detecting that the network connection status of the portable electronic device is not connected. The method also comprises activating a policy that disables password access to the electronic wallet application after the occurrence of a first predefined number of consecutive failed password access attempts to the electronic wallet application. The method also comprises disabling password access to the electronic wallet application and in response to receiving a key code entered into the portable electronic device, re-enabling password access attempts to the electronic wallet application.

In another embodiment, a method of protecting access to an electronic wallet application executing on a portable electronic device is provided. The method comprises detecting that the network connection status of the mobile communications device is not connected. The method also comprises activating a policy that locks the electronic wallet application after the occurrence of a first predefined number of failed password access attempts to the electronic wallet application. The method also comprises locking the electronic wallet application. The method also comprises a key code server providing a key code upon authenticated request and in response to receiving the key code entered into the portable electronic device, unlocking the electronic wallet application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
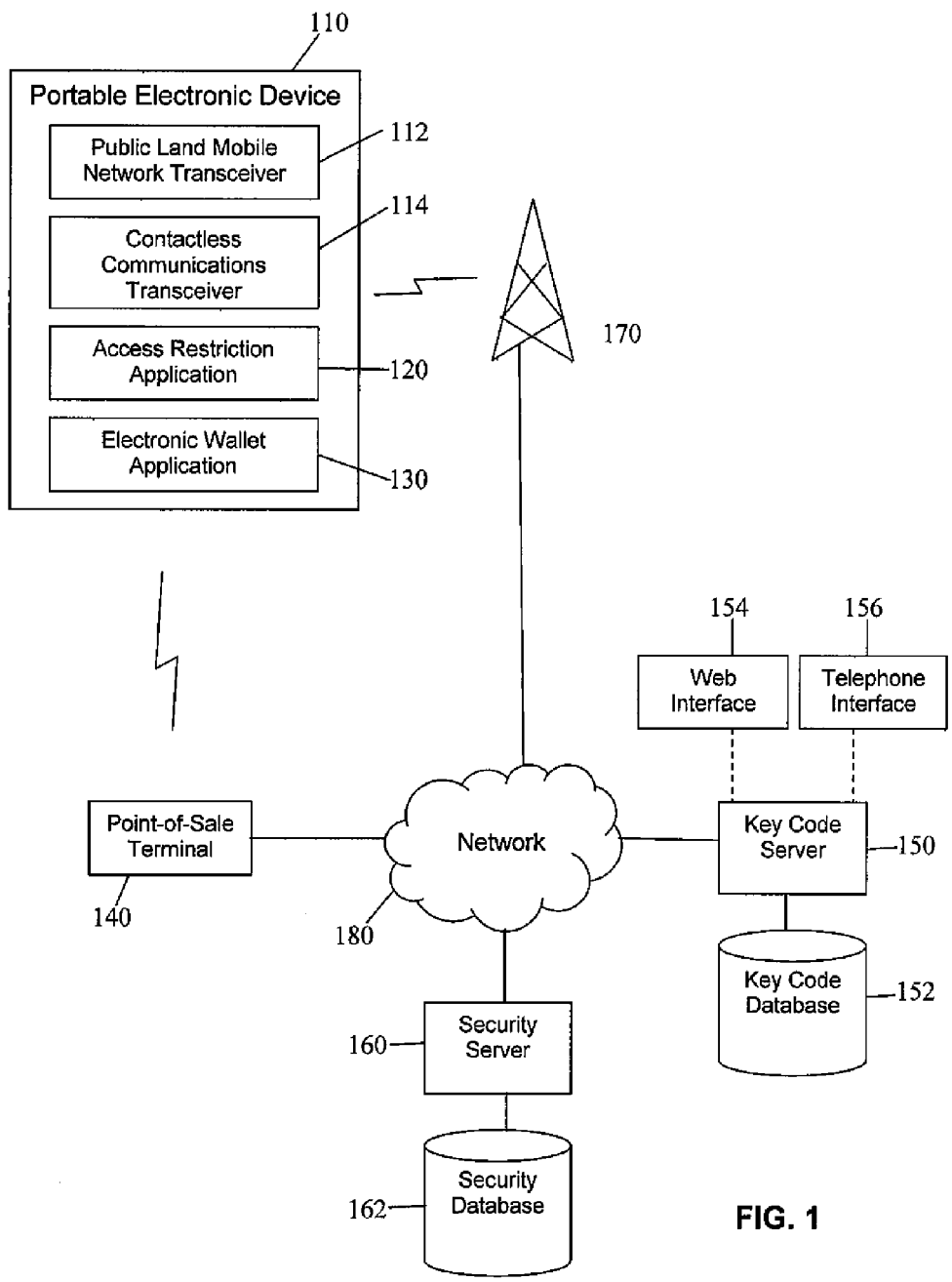
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Several embodiments of a mobile payment system password system permit an owner or authorized user of an electronic wallet application installed on a portable electronic device to use a permanent or one-time self-help reset key code when locked out of the electronic wallet application to regain password access. An access restriction application installed on the portable electronic device detects when the portable electronic device is not connected to a network and dynamically applies a more restrictive security policy for accessing the electronic wallet application. The more restrictive security policy reduces the number of consecutive failed password access attempts permitted to enter the electronic wallet application before it locks access to the electronic wallet application. In a scenario, the owner of the portable electronic device may have carelessly or clumsily entered the password to the electronic wallet application several times and been locked out. The system then provides for a key code to be entered into the keypad of the portable electronic device to unlock access to the electronic wallet application and permit further password attempts. The key code may be provided to the owner of the portable electronic device at a prior time for the owner's permanent use. The key code may alternatively be provided to the owner at the time of need by allowing the owner to contact a service provider via telephone, internet access, or other means and receive the key code after supplying authentication, for example by providing a shared secret.

These embodiments may provide a higher level of protection when a portable electronic device hosting an electronic wallet application is lost or stolen. When such a portable electronic device is out of the control of its owner for any reason and is also out of wireless service, the portable electronic device owner and wireless service operator may not be able make contact with the portable electronic device and change the security level of the electronic wallet application or any other functionality executing on the portable electronic device. An identity thief may either shut down the cellular network connectivity or intentionally not activate the connectivity if it is already disconnected to avoid having the wireless provider block access to the electronic wallet application if the portable electronic device was reported lost or stolen. The identity thief may also know that owners of portable electronic devices hosting electronic wallet applications often use short passwords for reasons of convenience. Short passwords are easier to guess or determine, for example, by using technology that subjects the targeted application or portable electronic device to brute force attacks of hundreds or thousands of combinations of numbers and/or other characters in attempted passwords in a short time. An identity thief with access to this technology may be able to successfully break into an electronic wallet application. The system of the present disclosure seeks to discourage these attacks when a lost or stolen portable electronic device is not connected to the wireless network and hence cannot be reached to shut down or render inaccessible the electronic wallet application. The key code provided beforehand to the portable electronic device owner or at the time of need is valuable if the portable electronic device is not connected to the network, still in the possession of the owner, and the owner temporarily forgets and/or inadvertently "fat fingers" the password for the electronic wallet application several times and is locked out. The owner can enter the key code into the keypad of the portable electronic device and be allowed additional password attempts to enter the electronic wallet application. The system provided by the present disclosure may be configured to permit as few as one, two, or three incorrect password attempts during periods of heightened risk due to the portable electronic device not having network connectivity. Without connection to the network, the owner may be unable to remotely disable the electronic wallet application or receive any immediate protection from reporting the portable electronic device to a service provider as lost or stolen, because the service provider may not be able to contact the portable electronic device to disable functionality.

Turning now to FIG. 1, a mobile payment system password system 100 is provided. The system 100 comprises a portable electronic device 110, an access restriction application 120, an electronic wallet application 130, a point-of-sale (POS) terminal 140, a key code server 150, a key code database 152, a security server 160, a security database 162, a wireless base station 170, and a network 180.

Though illustrated as a mobile phone, the portable electronic device 110 may take various forms including a mobile computer, a portable computer, a tablet computer, and a laptop computer. The portable electronic device 110 may take various forms with a screen size reduced to a maximum of 4 inches by 6 inches, including a mobile telecommunications device, a mobile handset, a personal digital assistant (PDA), a handheld gaming device, a handheld wireless mobile device, a pager, a digital camera, a digital music player, a media player, and a digital calculator. An exemplary embodiment of a handset suitable to implementing several embodiments of this disclosure, for example a mobile phone and a PDA, is discussed in detail hereinafter. The portable electronic device 110 includes one or more applications that provide services and functionality to a user, such as a mobile phone subscriber or a PDA user. These applications may comprise the electronic wallet application 130, an email service, an address book, a contacts list, a spreadsheet, a scheduler, a virtual private network (VPN) portal, a web browser, and other applications. In an embodiment, these applications may be launched or started by a number of methods including selecting a menu item shown on a display of the portable electronic device 110 and/or pressing keys on a keypad of the portable electronic device 110.

The portable electronic device 110 comprises a public land mobile network (PLMN) transceiver 112 that allows the portable electronic device 110 to make wireless signal contact with a wireless base station 170 to engage in voice and data communications with other parties. The portable electronic device 110 also comprises a contactless communications transceiver 114 that communicates with a point-of-sale terminal 140 to enable the electronic wallet application 130 or other application to complete a transaction without physically contacting the point-of-sale terminal 140, for example through radio frequency communication that may include near field communication (NFC) technology.

A payment for a product or service may be made electronically by the portable electronic device 110 through contactless communication with the point-of-sale terminal 140, for example by communicating payment information such as a credit card or a transit card account number. For purposes of the present disclosure, contactless communication is intended to include a wide variety of communication means including near field communication (NFC) technology, infrared, ultra-sonic, optical, radio frequency, wireless, Bluetooth, Wi-Fi, and other communication links that do not involve direct physical contact. In an embodiment, the point-of-sale terminal 140 completes the payment transaction by handshaking with a payment authorization center (not shown), communicating with the payment authorization center through the network 180. In another embodiment, the point-of-sale terminal 140 completes the payment transaction without communicating with the payment authorization center, for example when the payment information for a debit card is provided by the electronic wallet application 130.

The access restriction application 120 executes on the portable electronic device 110 and provides password access protection to the electronic wallet application 130. When the access restriction application 120 detects that the portable electronic device 110 is not connected to its network provider such that it is not receiving signals from a wireless base station 170 and may not engage in two-way communications, the access restriction application 120 activates a password access policy for the electronic wallet application 130 that is more restrictive than the password access policy in effect when the portable electronic device 110 is in contact with its network provider. The access restriction application 120 may regularly monitor the public land mobile network transceiver 112 installed in the portable electronic device 110 for signals received from a wireless base station 170 or it may contact a different hardware component or software component in the portable electronic device 110 to monitor network connectivity. While shown as a separate application, the access restriction application 120 may in some embodiments be part of and/or integrated with the electronic wallet application 130.

The password access policy enforced by the access restriction application 120 when it detects that the portable electronic device 110 is not in connection with its network provider is more restrictive and stands in contrast with a less restrictive password access policy enforced by the access restriction application 120 when the portable electronic device 110 is connected to its network provider. If the portable electronic device 110 is lost or stolen and its network connectivity is not in effect for some reason, the user cannot make contact with the portable electronic device 110 and block access to the electronic wallet application 130 or other applications. The user may not know whether the portable electronic device 110 is unreachable because it is out of range of the wireless base station 170, the network functionality on the portable electronic device 110 was intentionally or accidentally turned off by a party that stole or found the portable electronic device 110, or other reason. The user is concerned with blocking access to the electronic wallet application 130. The more restrictive access policy is put into effect when the access restriction application 120 detects that the portable electronic device 110 is not in contact with its network provider.

The access restriction application 120 determines whether the portable electronic device 110 is connected to the wireless network via the wireless base station 170 or other means. The access restriction application 120 applies the less restrictive policy when the portable electronic device 120 is connected to the wireless network. When the access restriction application 120 determines that the portable electronic device 120 is not connected to the wireless network, the access restriction application 120 then applies the more restrictive policy and begins monitoring the electronic wallet application 130 for consecutive incorrect password access attempts. In an embodiment, the access restriction application 120 may also monitor the electronic wallet application 130 for incorrect password attempts during times when it has the less restrictive policy in effect. Should network connectivity then terminate, the access restriction application 120 will continue to monitor but with the heightened restrictions called for by the more restrictive policy, for example, permitting fewer consecutive failed access attempts and/or mandating a longer time frame within which consecutive failed attempts will invoke a lockout.

In an embodiment, the access restriction application 120 may start a timer when an incorrect password is entered into the portable electronic device 120. The timer may be used to limit the number of incorrect password access attempts that are permitted before locking the electronic wallet application 130. For example, in an embodiment, the access restriction application 120 may limit the number of incorrect password access attempts in any fifteen second time interval to one or two failed attempts. If this limit is exceeded within the fifteen second time interval, then the access restriction application 120 may lock the electronic wallet application 130. On the other hand, if more than two failed attempts occur—but the failed attempts are separated by at least fifteen seconds—the access restriction application 120 would not lock the electronic wallet application 130. This optional time based feature of the access restriction application 120 may promote defeating electronic and/or brute force attacks on the security of the electronic wallet application 130. In an embodiment, the predetermined time interval for further password attempt lockout may be sixty seconds, one hundred twenty seconds, or another interval of time. In other embodiments, however, a timer may not be used and the access restriction application 120 may monitor for consecutive incorrect password access attempts without regard to a time interval within which the incorrect attempts occur.

In another embodiment, however, the access restriction application 120 does not employ a timer. In this embodiment, the access restriction application 120 may simply count the number of failed password attempts since a previous successful access to the electronic wallet application 130 or since the restricted access policy was activated. The access restriction application 120 may allow a predefined number of failed password attempts before locking the electronic wallet application, such as one failed attempt, two failed attempts, three failed attempts, or some other number of failed attempts effective to provide heightened security when off network. In an embodiment, the access restriction application 120 may lock the electronic wallet application 120 after a single failed password attempt.

In an embodiment, the access restriction application 120 may allow only two consecutive failed password access attempts to the electronic wallet application 130 during the interval of time when it detects the portable electronic device 110 is not connected to its network whereas it may instead allow four consecutive failed attempts when the portable electronic device 110 is connected to its network. Locking a party out of the electronic wallet application 130 after a fewer number of failed password attempts when the portable electronic device 110 is not connected to its network protects the application 130 from a brute force password discovery attack by a malicious party that steals or finds the portable electronic device 110 and shuts down the network connectivity or does not turn it on if is already off. If the portable electronic device 110 is lost or stolen and the portable electronic device 110 remains in network contact, the rightful owner of the portable electronic device 110 may contact the service provider, report this loss or theft, and the service provider may shut down the ability of the portable electronic device 110 to make telephone calls. The service provider may also invoke instructions to block access to the electronic wallet application 130 and other applications until the portable electronic device 110 is recovered. In the event the portable electronic device 110 is misplaced, lost, or stolen and the network connectivity is intentionally turned off, the access restriction application 120 will limit the number of password access attempts to launch the electronic wallet application 130, providing protection to the electronic wallet application 130 when the misplaced, lost, or stolen portable electronic device 110 is not connected to its network.

The access restriction application 120 also unlocks the electronic wallet application 130 when locked for additional password access attempts when a key code is entered into the keypad of the portable electronic device 110. The key code is a string of numbers and/or other characters that may be provided to or set by the owner of the portable electronic device 110 when the owner initially takes possession of the portable electronic device 110. The key code is used by the owner when the owner has temporarily forgotten or accidentally "fat fingered" the password to access the electronic wallet application 130 enough times that the access restriction application 120 locks the electronic wallet application 130 from further password access attempts. In an embodiment, the key code may be used by the owner of the portable electronic device 110 to override the lockout when the portable electronic device 110 is either connected or not connected to its network. If the owner of the portable electronic device 110 has forgotten, does not have access to, or never did receive or set the key code to unlock password access and is locked out of further password access attempts to the electronic wallet application 130, the owner may also contact a key code server 150 either by telephone or internet access, provide authenticating information and be provided a one-time key code that the owner may use to unlock password access to the electronic wallet application 130. The authenticating information, for example, may be a shared secret such as a pet's name or other secret. While successfully entering a key code will, as described, provide the owner additional attempts to enter the correct password for the electronic wallet application 130, in an embodiment, the system may be configured to enable the successful entry of a key code to permit access to the electronic wallet application 130 without the need to also enter a password.

The access restriction application 120 prohibits further password access attempts to the electronic wallet application 130 when the threshold number of consecutive failed password access attempts has been reached depending on whether the portable electronic device 110 is connected to its network or not connected its network. The access restriction application 120 may not control access to any other applications available on the portable electronic device 110. If the portable electronic device 110 is stolen or lost, the access restriction application 120 may not prohibit a party in possession of the portable electronic device 110 from accessing applications other than the electronic wallet application 130.

The electronic wallet application 130 executes on the portable electronic device 110 and provides a variety of financial and payment capabilities. The application 130 supports paying for products or services with the portable electronic device 110 in much the same way as presenting a credit card, a debit card, or a transit card for payment. The application may also include and permit the use of loyalty cards, product coupons, and gift cards. Additionally, the electronic wallet application 130 may promote paying from a payment account. In an embodiment, more than one instance of an electronic wallet application 130 may execute on a portable electronic device 110 wherein, for example, two different family members wish to store their wallet information separately on the same portable electronic device 110. In an embodiment, more than one instance of the access restriction application 120 may execute on the portable electronic device 110 to provide password access protection as described in the present disclosure. Additional information about electronic wallet technology is provided in U.S. patent application Ser. No. 11/949,759 entitled Method for Launching an Electronic Wallet filed Dec. 3, 2007 by Allison DiMartino, et al. and U.S. patent application Ser. No. 11/863,632 entitled Method and System for Setting Levels of Electronic Wallet Security filed Sep. 28, 2007 by Allison DiMartino, et al. which are incorporated herein by reference for all purposes.

The point-of-sale terminal 140 may be embodied as a general purpose computer system, to be discussed in greater detail hereinafter. The point-of-sale terminal 140 communicates via contactless communication with the portable electronic device 110 by any of a variety of means including near field communication (NFC) technology, infra-red, ultrasonic, optical, radio frequency, Bluetooth, Wi-Fi, and other communication links. The point-of-sale terminal 140 may be connected to databases or networked to servers (not shown) which provide product and service pricing information, including any discounting associated with a loyalty card and/or product coupons. In an embodiment, the point-of-sale terminal 140 may include a device for scanning a product, for example a barcode reader or radio frequency identification (RFID) reader, to identify a product and to add the associated cost to an accumulating purchase total. In an embodiment, the point-of-sale terminal 140 that the portable electronic device 110 is connected with completes the payment transaction by handshaking with a payment authorization center (not shown), communicating with the payment authorization center via the network 180.

The key code server 150 provides one-time key codes to owners of portable electronic devices 110 that have been barred by the access restriction application 120 from further password access attempts to the electronic wallet application 130. When the owner of the portable electronic device 110 does not have a key code in his or her possession for any reason at the time the owner has been barred from further password access attempts to the electronic wallet application 130, the owner may contact the key code server 150 via internet or telephone access, using a web interface 154 or telephone interface 156, respectively. Upon supplying information that the key code server 150 authenticates with the security server 160, the owner receives from the key code server 150 a one-time key code to enter into the portable electronic device 110 and to receive further access attempts to enter the correct password into the portable electronic device 110 and use the electronic wallet application 130. The key code server 150 is associated with a key code database 152. After authentication by the security server 160, upon receiving a request from the key code server 150, the key code database 152 provides a one-time key code to the key code server 150. The key code server 150 then communicates the one-time key code to the owner of the portable electronic device 110 back through the web interface 154 or telephone interface 156 used by the owner to contact the key code server 150. The key code database 152 is associated with the key code server 150 and provides one-time key codes to the key code server upon request of the key code server 150.

The one-time key code generated by the key code database 152 and provided by the key code server 150 to the owner of the portable electronic device 110 is a single use code that may be used only for recovering from one lockout of the portable electronic device 110. The portable electronic device 110 is provisioned with the single use code before the lockout occurs, for example before the electronic device 110 is removed from the retail store where it is purchased or over-the-air while the electronic device 110 is connected to the wireless network. In an embodiment, a master key may be provisioned and/or configured into the portable electronic device 110 that is known to the key code database 152. When the key code database 152 generates the one-time key code, it derives the one-time key code from the master key provisioned into the portable electronic device 110. When the one-time key code is entered into the portable electronic device 110, the access restriction application 120, for example, is able to confirm that the one-time key code is related to the master key configured into the portable electronic device 110. After the use of the one-time key code, the access restriction application 120 may mark the one-time key code as thereafter invalid, such that an attempt to reuse the one-time key code at a later time to unlock the electronic wallet application 130 would fail. Alternatively, the one-time key is provisioned into the portable electronic device 110 during a period of network connectivity after a use of a one-time key to unlock the electronic wallet application 130.

The web interface 154 is a world wide web browser executing on an electronic device (not shown), for example a desktop computer or laptop computer, with access to the world wide web via the Internet. In an embodiment, an owner of a portable electronic device 110 that has been barred by the access restriction application 120 from further password access attempts to the electronic wallet application 130 may enter a world wide web address in a web browser to contact the key code server 150, be displayed a web page associated with the key code server 150, enter account information and authenticating information into the web interface 154, and receive a one-time key code through the web interface 154. The telephone interface 156 is a telephone that the owner of a portable electronic device 110 may use to call into the key code server 150, enter account information and authenticating information into the telephone interface 156 either by voice or manual entries into the telephone interface 156, and receive a one-time key code through the telephone interface 156.

The security server 160 receives messages originated by the key code server 150 to authenticate requests submitted by the owner of a portable electronic device 110 or other authorized party when the access restriction application 120 has disabled password access to the electronic wallet application 130. The security server 160 verifies with an associated security database 162 that the identifying and authenticating information provided by the owner of the portable electronic device 110 is either correct or incorrect. The security server 160 then communicates back to the key code server 150 that the authentication attempt has either passed or failed. If the authentication attempt passes, the key code server 150 may provide the requested one-time key code to the owner of the portable electronic device 110 so the owner may then enter the one-time key code and be allowed further attempts to enter the correct password into the electronic wallet application 130.

The key code, whether provided to the owner of the portable electronic device 110 beforehand, for example when the owner takes possession of the portable electronic device 110 and first starts the electronic wallet application 130 on the portable electronic device 110, or at the time of need for the key code when the owner has been locked out of the electronic wallet application 130 and is provided a one-time key code, is only of use to the owner in receiving additional password access attempts to the electronic wallet application 130. In some embodiments, the key code when entered successfully only allows the owner of the portable electronic device 110 further password access attempts. It does not allow the owner of the portable electronic device 110 immediate use of the electronic wallet application 130. The owner must still enter the correct password to enter the electronic wallet application 130. If the owner loses or forgets the correct password for the electronic wallet application 130, the owner may recover the password using methods not described in the present disclosure.

The wireless base station 170 may be any of a cellular wireless base station, for example a Code Division Multiple Access (CDMA), Global System for Mobile Communications (GSM), and/or Universal Mobile Communications System (UMTS) cellular wireless base station; a World-wide Interoperable Microwave Access (WiMAX) base station; a WiFi access point; or other wireless access device.

The network 180 promotes communication between the components of the system 100. The network 180 may be any communication network including a public data network (PDN), a public switched telephone network (PSTN), a public land mobile network (PLMN), a private network, and/or a combination thereof.

Figure 2:
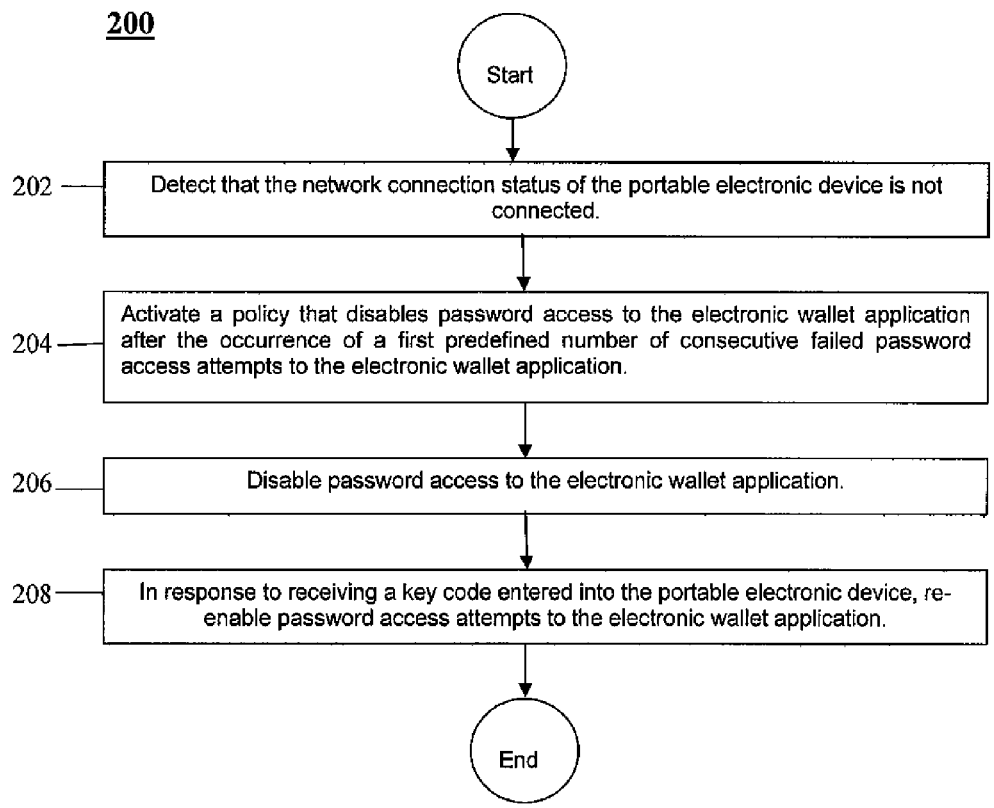
FIG. 2 is a flow chart illustrating a method according to an embodiment of the disclosure.

Turning now to FIG. 2, a method 200 for restricting password access to a mobile payment system is provided. At block 202, the access restriction application 120 monitors the network connection status of the portable electronic device 110. In an embodiment, the portable electronic device 110 is a mobile telephone that is in regular signaling contact with a wireless base station 170. The access restriction application 120 regularly monitors the public land mobile network transceiver 112 of the portable electronic device 110 or other component for signal connectivity between the portable electronic device 110 and the wireless base station 170. At block 202, the access restriction application 120 detects that the network connection of the portable electronic device 110 is not connected as the signaling between the portable electronic device 110 and a wireless base station 170 is not detected.

At block 204, after the access restriction application 120 has detected that the portable electronic device 110 is not in connection with its network provider, the access restriction application 120 activates a more restrictive security policy for the electronic wallet application 130 than when connected to its network provider. The more restrictive policy calls for the access restriction application 120 to lock a user out of further password access attempts when the user has completed a predetermined number of consecutive failed password access attempts to the electronic wallet application 130.

In an embodiment, the predetermined threshold quantity of consecutive failed password attempts are entered into the portable electronic device 110 during the time interval and the access restriction application 120 consequently at block 206 disables further password access attempts to the electronic wallet application 130. The failed password attempts may have been entered by a party that stole the portable electronic device 110, by a party that found the portable electronic device 110 after it was lost by the owner, or by another party. The failed password attempts may alternatively have been entered by the owner of the portable electronic device 110 who either forgot the correct password to the electronic wallet application 130 and made incorrect password attempts or who knew the correct password but accidentally entered the correct password several times in a clumsy or careless fashion, commonly known as "fat fingering" an entry, and is locked out.

At block 208, the access restriction application 120 receives the key code previously provided to the owner of the portable electronic device 110. In an embodiment, the key code is manually entered into the keypad of the portable electronic device 110 by the owner. In an embodiment, a key code may not literally be a string of key entries physically pressed into the keypad of the portable electronic device 110 and may instead be a voice command spoken into the microphone of the portable electronic device 110, a motion to which the portable electronic device 110 is physically subjected by the owner of the portable electronic device 110, or some combination of these actions.

In the method 200, the key code was provided to the owner of the portable electronic device 110 on a date prior to the occurrence of the password access lockout by the access restriction application 120. The key code may have been provided to the owner of the portable electronic device 110 by the vendor of the portable electronic device 110 and/or provider of the electronic wallet application 130 software when the owner first took possession of the portable electronic device 110. In an embodiment, the owner of the portable electronic device 110 is provided the key code one time and the key code does not change.

Continuing at block 208, having received the correct key code, the access restriction application 120 provides a new set of password access attempts to the owner or user of the portable electronic device 110. The quantity of newly allowed password access attempts to the electronic wallet application 130 depends on whether the portable electronic device 110 is detected as connected to its network provider or not connected to its network provider.

Figure 3:
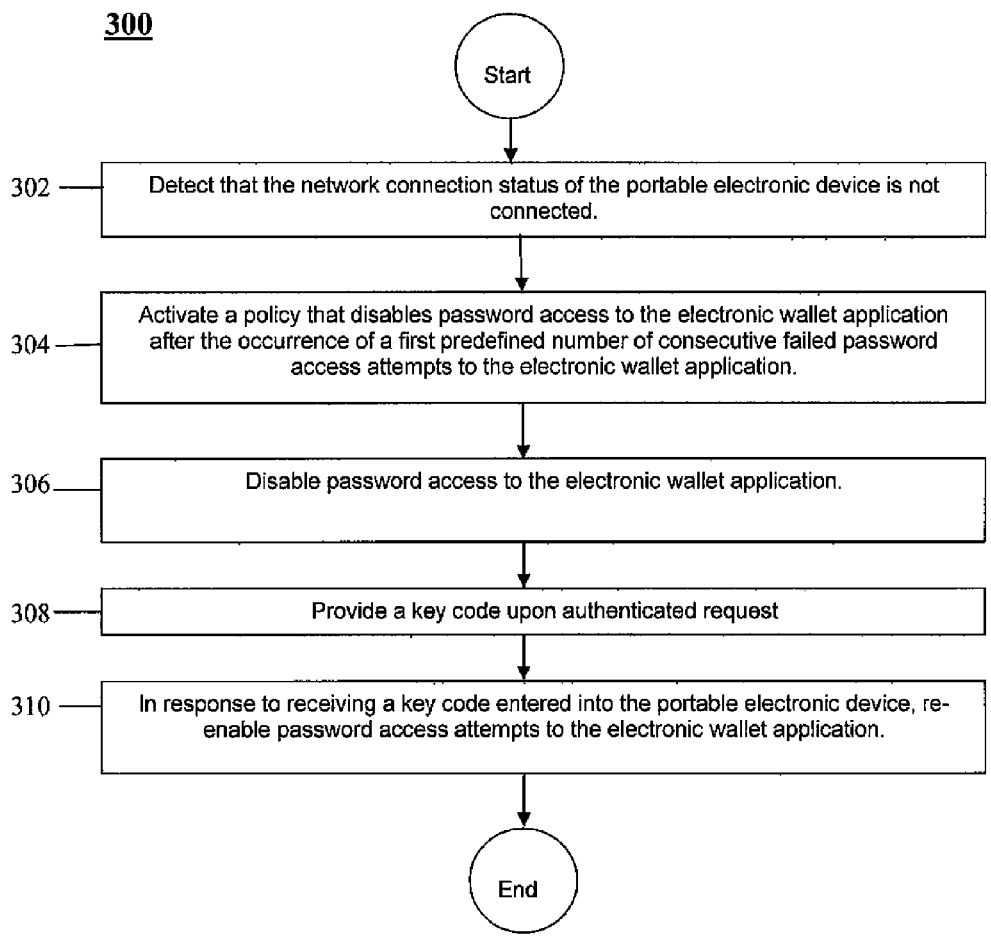
FIG. 3 is a flow chart illustrating another method according to an embodiment of the disclosure.

Turning now to FIG. 3, a method 300 for restricting password access to a mobile payment system is provided. The method 300 describes a similar scenario as presented in the method 200 wherein a portable electronic device 110 in which an electronic wallet application 130 is executing is detected as being not connected to its network and a more restrictive password access policy is enforced by the access restriction application 120. Blocks 302 through 306 of the method 300 are substantially identical to blocks 202 through 206 of the method 200. At block 302, the portable electronic device 110 is detected to be not connected to the wireless network and at block 304, a policy is enforced that disables further password access attempts to the electronic wallet application 130 after a predetermined number of consecutive failed password access attempts have occurred. In an embodiment, the predetermined number of consecutive failed password access attempts to the electronic wallet application 130 are received and at block 306, further password access attempts are barred in accordance with the restrictive policy in effect when the portable electronic device 110 is not connected to its network provider.

At block 308, the owner or user of the portable electronic device 110 uses a web interface 154 or telephone interface 156 to contact the key code server 150. The owner supplies account identifying information and authentication. The key code server 150 verifies the identity of the owner and authenticates the request with the security server 160. Upon receiving positive verification from the security server 160, the key code server 150 then draws a one-time key code from the key code database 152 and provides it to the owner of the portable electronic device 110 through the web interface 154 or telephone interface 156. The key code provided in the method 300 is a single-use code, for present use by the owner unlocking password access to the electronic wallet application 130. The key code may be used only for the present instance of lock out. Once the key code has been successfully used and the owner of the portable electronic device 110 has been allowed further password access attempts, the key code may not be used again. At block 308, the owner enters the key code into the portable electronic device 110. The key code may be a word or other string of characters that is either manually entered into the keypad of the portable electronic device or verbally spoken into the microphone of the portable electronic device.

At block 310, the access restriction application 120 receives the key code provided to the owner at block 308. Having verified that one-time key code is valid, the access restriction application 120 provides a new set of password access attempts to the owner or user of the portable electronic device 110. The quantity of newly allowed password access attempts to the electronic wallet application 130 depends on whether the portable electronic device 110 is detected as connected to its network provider or not connected to its network provider.

Figure 4:
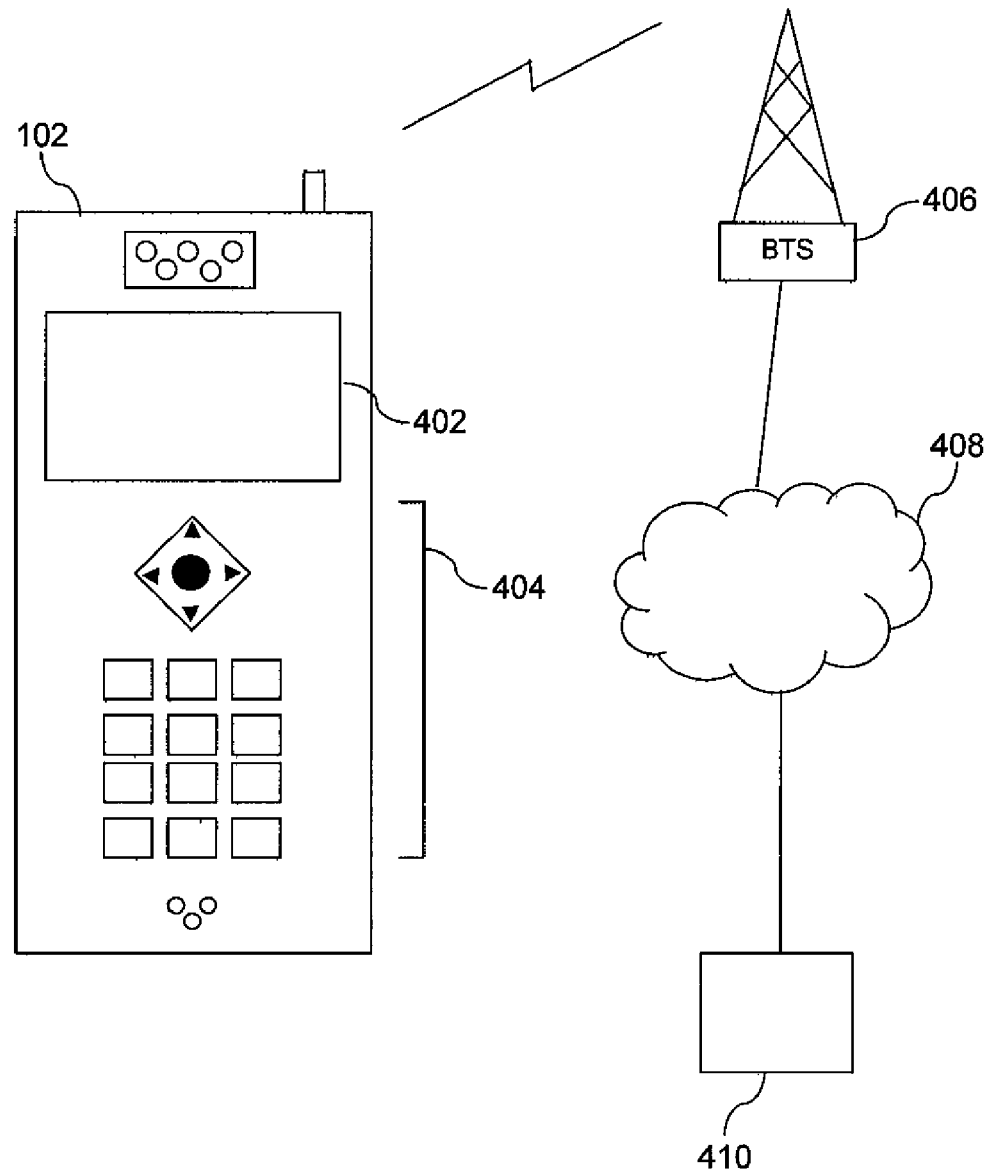
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, for example the portable electronic device 110, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 5:
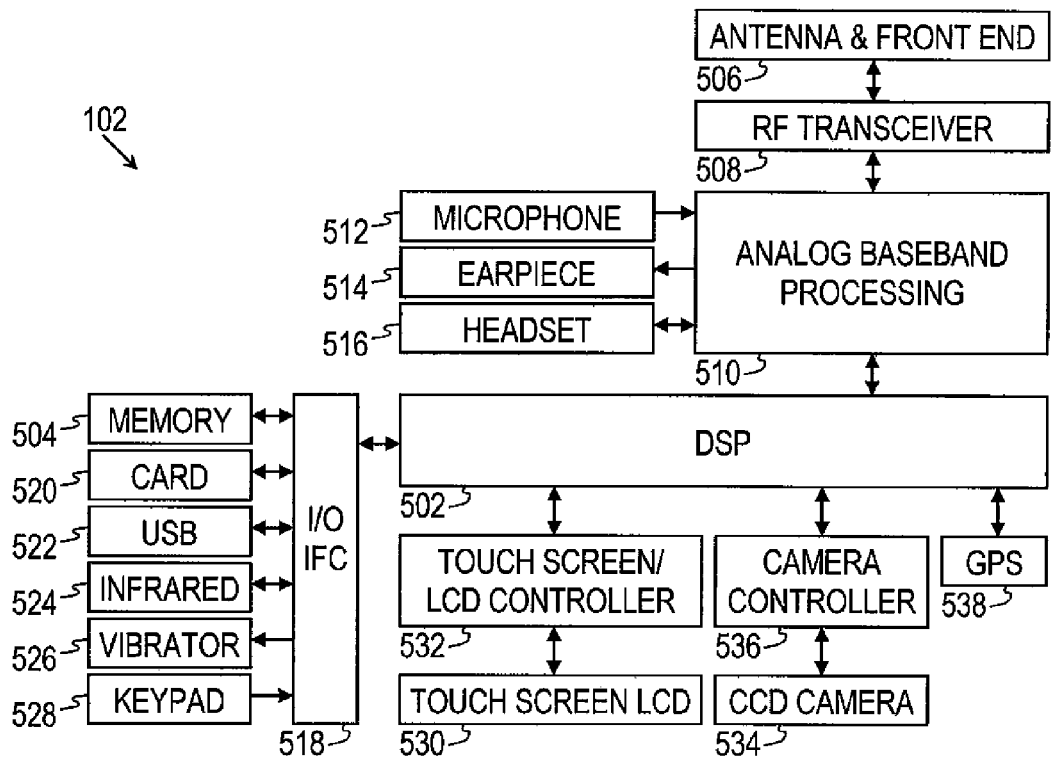
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RE transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
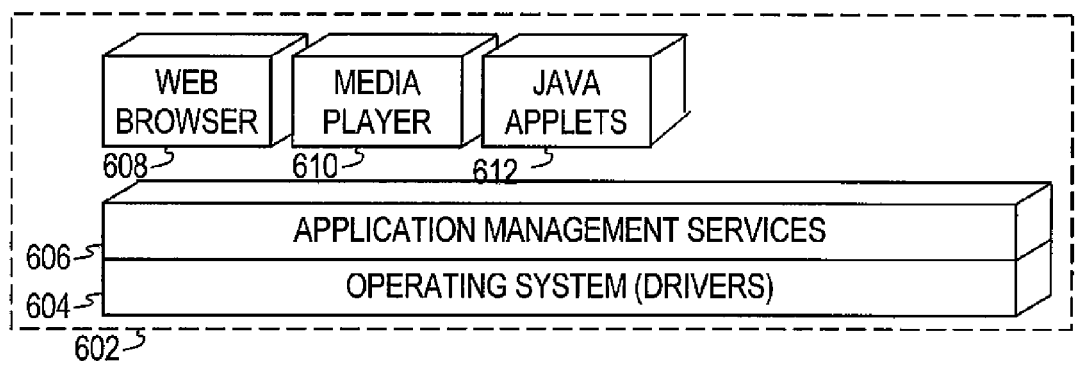
FIG. 6 is a block diagram of a software configuration for a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
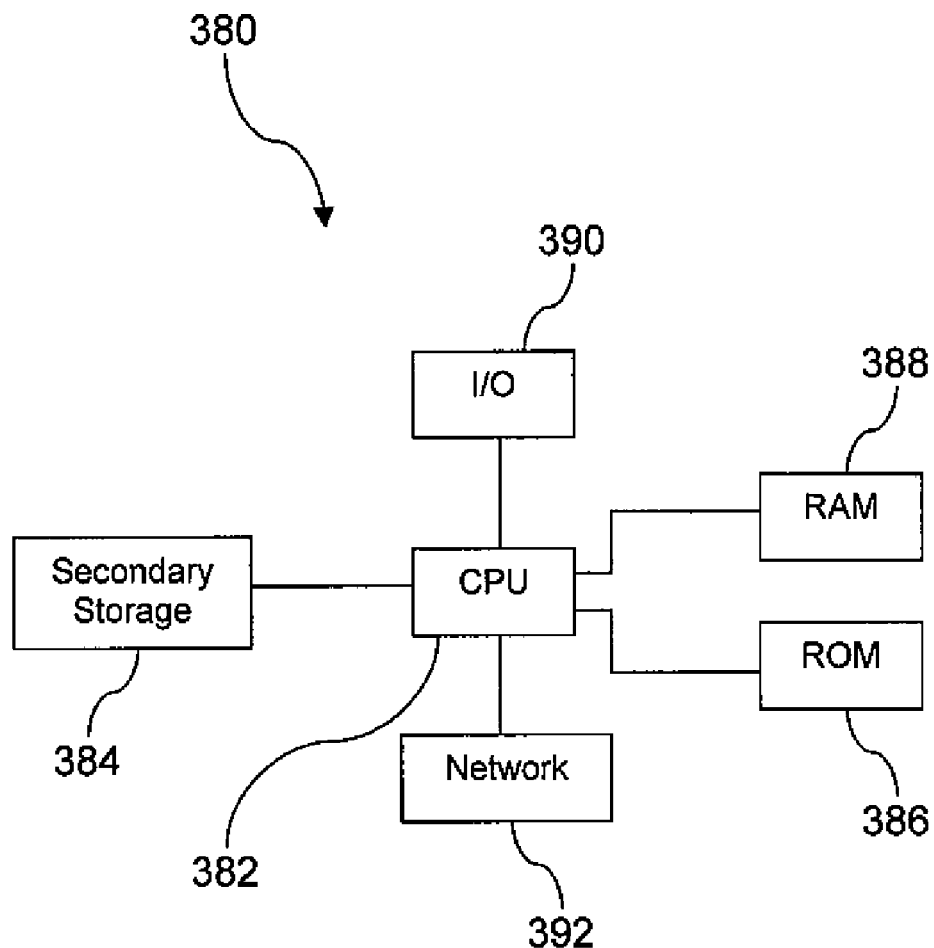
FIG. 7 illustrates an exemplary general purpose computer system suitable for implementing some aspects of the several embodiments of the disclosure.

Some aspects of the system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 392 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile payment system password restriction system, comprising:
   a portable electronic device;
   a non-transitory computer readable storage medium of the portable electronic device comprising an access restriction application that, when executed on the portable electronic device causes the portable electronic device to perform the steps of:
   storing a security policy, the security policy prohibits further password access attempts to an electronic wallet application on the portable electronic device when the portable electronic device is not connected to a network provider after a first predefined threshold quantity of consecutive failed password access attempts that is less than a second quantity of consecutive failed password access attempts permitted when the portable electronic device is connected to the network provider;
   detecting that the portable electronic device is not connected to the network provider;
   applying the security policy in response to detecting that the portable electronic device is not connected to the network provider;
   detecting the first predefined threshold quantity of consecutive failed password access attempts to the electronic wallet application based on applying the security policy when the portable electronic device is not connected to the network provider;

disabling password access to the electronic wallet application based on applying the security policy when the portable electronic device is not connected to the network provider after detecting the first predetermined threshold quantity of consecutive failed password access attempts to the electronic wallet application;

receiving a key code entered into the portable electronic device after disabling password access to the electronic wallet application, wherein the key code is different from a password that enables access to the electronic wallet application;

in response to receiving the key code, determining a non-zero quantity of newly allowed password attempts to the electronic wallet application, based on whether or not the portable electronic device is detected to be connected to the network provider; and based on the determining, providing the user of the portable electronic device a number of newly allowed password attempts.

2. The system of claim 1, wherein the portable electronic device is one of a mobile telecommunication device, a mobile handset, a personal digital assistant, a handheld gaming device, a handheld wireless mobile device, a pager, a digital camera, a digital music player, a media player, and a digital calculator.

3. The system of claim 1, wherein the electronic wallet application electronically stores information of at least one of a debit card, a credit card, a transit card, a loyalty card, a gift card, and a product coupon for use in completing point of sale transactions.

4. The system of claim 1, wherein the access restriction application, when executed by the portable electronic device, further causes the portable electronic device to perform the steps of:

storing a second security policy, the second security policy prohibits further password access attempts to the electronic wallet application after a second predetermined threshold quantity of consecutive failed password access attempts that is greater than the first predetermined threshold quantity of consecutive failed password access attempts;

detecting that the portable electronic device is connected to the network provider;

applying the second security policy in response to detecting that the portable electronic device is connected to the network provider;

detecting the second predefined threshold quantity of consecutive failed password access attempts to the electronic wallet application based on applying the second security policy when the portable electronic device is connected to the network provider; and disabling password access to the electronic wallet application based on applying the second security policy when the portable electronic device is connected to the network provider after detecting the second predetermined threshold quantity of consecutive failed password access attempts to the electronic wallet application.

5. The system of claim 1, wherein the access restriction application does not restrict access to other applications executing on the portable electronic device.

6. A method of protecting access to an electronic wallet application executing on a portable electronic device, comprising:

storing a security policy on the portable electronic device, the security policy prohibits further password access attempts to the electronic wallet application after a first predefined threshold quantity of consecutive failed password access attempts to the electronic wallet application that is less than a second quantity of consecutive failed password access attempts to the electronic wallet application permitted when the portable electronic device is connected to a network provider;

detecting, by an access restriction application stored in a non-transitory computer readable storage medium of the portable electronic device and executing on the portable electronic device, that the portable electronic device is not connected to the network provider;

applying, by the access restriction application, the security policy in response to detecting that the portable electronic device is not connected to the network provider;

detecting, by the access restriction application, the first predefined threshold quantity of consecutive failed password access attempts to the electronic wallet application based on applying the security policy when the portable electronic device is detected to not be connected to the network provider;

disabling, by the access restriction application, password access to the electronic wallet application based on applying the security policy when the portable electronic device is detected to not be connected to the network provider after detecting the first predefined threshold quantity of consecutive failed password access attempts to the electronic wallet application;

receiving, by the access restriction application, a key code entered into the portable electronic device after disabling password access to the electronic wallet application;

in response to receiving the key code, determining a non-zero quantity of newly allowed password attempts to the electronic wallet application, based on whether or not the portable electronic device is detected to be connected to the network provider; and based on the determining, providing the user of the portable electronic device a number of newly allowed password attempts.

7. The method of claim 6, wherein the key code is entered into a keypad of the portable electronic device.

8. The method of claim 6, further comprising:

monitoring, by the access restriction application, the electronic wallet application for the first predefined threshold quantity of consecutive failed password access attempts to the electronic wallet application.

9. The method of claim 6, further comprising:

storing a second security policy on the portable electronic device, the second policy prohibits further password access attempts to the electronic wallet application after a second predefined threshold quantity of consecutive failed password access attempts to the electronic wallet application that is greater than the first predefined threshold quantity of consecutive failed password access attempts to the electronic wallet application;

detecting, by the access restriction application, that the portable electronic device is connected to the network provider;

applying, by the access restriction application, the second security policy in response to detecting that the portable electronic device is connected to the network provider.

10. The method of claim 6, wherein the security policy prohibits further password access to the electronic wallet application first predefined threshold quantity of consecutive failed password access attempts to the electronic wallet application within a specified time interval.

11. A method of protecting access to an electronic wallet application executing on a portable electronic device, comprising:

storing a security policy on the portable electronic device, the security policy locks the electronic wallet application after a first predefined threshold quantity of failed password access attempts to the electronic wallet application that is less than a quantity of consecutive failed password access attempts to the electronic wallet application permitted when the portable electronic device is connected to a network provider;

detecting, by an access restriction application stored in a non-transitory computer readable storage medium of the portable electronic device and executing on the portable electronic device, that the portable electronic device is not connected to the network provider;

activating, by the access restriction application, the security policy in response to detecting that the portable electronic device is not connected to the network provider;

detecting, by the access restriction application, the first predefined threshold quantity of consecutive failed password access attempts to the electronic wallet application based on the activated security policy when the portable electronic device is detected to not be connected to the network provider;

locking the electronic wallet application based on the activated security policy when the portable electronic device is detected to not be connected to the network provider after detecting the first predefined threshold quantity of consecutive failed password access attempts to the electronic wallet application;

receiving, by the access restriction application, a key code entered into the portable electronic device after locking the electronic wallet application;

in response to receiving the key code, determining a non-zero quantity of newly allowed password attempts to the electronic wallet application, based on whether or not the portable electronic device is detected to be connected to the network provider; and based on the determining, providing the user of the portable electronic device a number of newly allowed password attempts.

12. The method of claim 11, wherein the key code is manually entered into a keypad of the portable electronic device or spoken into a microphone of the portable electronic device.

13. The method of claim 11, further comprising:

detecting that the electronic wallet application has received a correct password for accessing the electronic wallet application after unlocking the electronic wallet application;

providing access to the electronic wallet application in response to detecting that the electronic wallet application has received the correct password after unlocking the electronic wallet application.

14. The system of claim 1, further comprising:

a key code server configured to provide the key code in response to an authenticated request, wherein the key code server is accessible through a telephone interface, and the key code server is configured to receive instructions as a voice instruction or push-button entry instruction through the telephone interface.

15. The system of claim 1, wherein the network provider is a provider of a wireless network.

16. The system of claim 4, wherein the access restriction application, when executed by the portable electronic device, further causes the portable electronic device to perform the steps of:

disabling the second security policy in response to detecting that the portable electronic device is not connected to the network provider.

17. The method of claim 6, further comprising:

provisioning the key code into the portable electronic device during one of activating of the portable electronic device or provisioning the electronic wallet application on the portable electronic device.

18. The method of claim 11, further comprising:

disabling the second security policy in response to detecting that the portable electronic device is not connected to the network provider.

* * * * *